(12) United States Patent
Pirchio

(10) Patent No.: US 8,068,107 B2
(45) Date of Patent: Nov. 29, 2011

(54) METHOD TO SYNCHRONIZE AUDIO AND GRAPHICS IN A MULTIMEDIA PRESENTATION

(76) Inventor: Mario Pirchio, Pisa (IT)

( * ) Notice: Subject to any disclaimer, the term of this patent is extended or adjusted under 35 U.S.C. 154(b) by 976 days.

(21) Appl. No.: 11/718,574

(22) PCT Filed: Nov. 22, 2004

(86) PCT No.: PCT/IB2004/003796
§ 371 (c)(1),
(2), (4) Date: May 3, 2007

(87) PCT Pub. No.: WO2006/054126
PCT Pub. Date: May 26, 2006

(65) Prior Publication Data
US 2009/0073176 A1    Mar. 19, 2009

(51) Int. Cl.
G06T 15/70    (2006.01)
(52) U.S. Cl. ............ 345/473; 345/956; 386/55; 386/68; 434/169; 434/185; 704/275; 704/276
(58) Field of Classification Search .................. 345/956, 345/473; 434/169, 185; 386/55, 68
See application file for complete search history.

(56) References Cited

U.S. PATENT DOCUMENTS

| | | | | |
|---|---|---|---|---|
| 4,884,972 A | * | 12/1989 | Gasper | 434/185 |
| 5,630,017 A | * | 5/1997 | Gasper et al. | 704/276 |
| 5,987,416 A | * | 11/1999 | Matsumoto | 704/275 |
| 6,022,222 A | * | 2/2000 | Guinan | 434/169 |
| 6,369,821 B2 | * | 4/2002 | Merrill et al. | 345/473 |
| 6,404,978 B1 | * | 6/2002 | Abe | 386/55 |
| 2004/0001694 A1 | * | 1/2004 | Evans et al. | 386/68 |
| 2004/0174365 A1 | * | 9/2004 | Bub | 345/473 |

FOREIGN PATENT DOCUMENTS

WO    98/44483 A    10/1998

OTHER PUBLICATIONS

Lai, Siet-Lang. "How to Transform Static Data Descriptors for Audio and Images on the Web." SYS-CON Media, Inc. [online], Dec. 3, 2001 [retrieved on Aug. 4, 2010]. Retrieved from the Internet <URL:http://xml.sys-con.com/node/40296>.*
"endSync Property," msdn [online] [online], 2011 [retrieved on Jan. 15, 2011]. Retrieved from the Internet <URL:http://msdn.microsoft.com/en-us/library/ms533166(VS.85,printer).aspx>.*

* cited by examiner

Primary Examiner — Kimbinh T Nguyen
(74) Attorney, Agent, or Firm — Dennison, Schultz & MacDonald

(57) ABSTRACT

In a multimedia presentation, having speech and graphic contributions, a list of graphic objects is provided. Each graphic is associated to a graphic file capable of being executed by a computer to display a corresponding graphic contribution on a screen. A speech file comprising a sequence of phrases is also created, each phrase comprising a speech contribution explaining at least one graphic contribution associated to a respective graphic object. Then, an arrangement string is created obtained as a sequence of a first graphic object and a respective first phrase, and then a second graphic object and a respective second phrase, and so on up to completion of all graphic objects and phrases of said list and of said speech file respectively. A processing speed for displaying the graphic objects is chosen.

11 Claims, 14 Drawing Sheets

FIG. 4
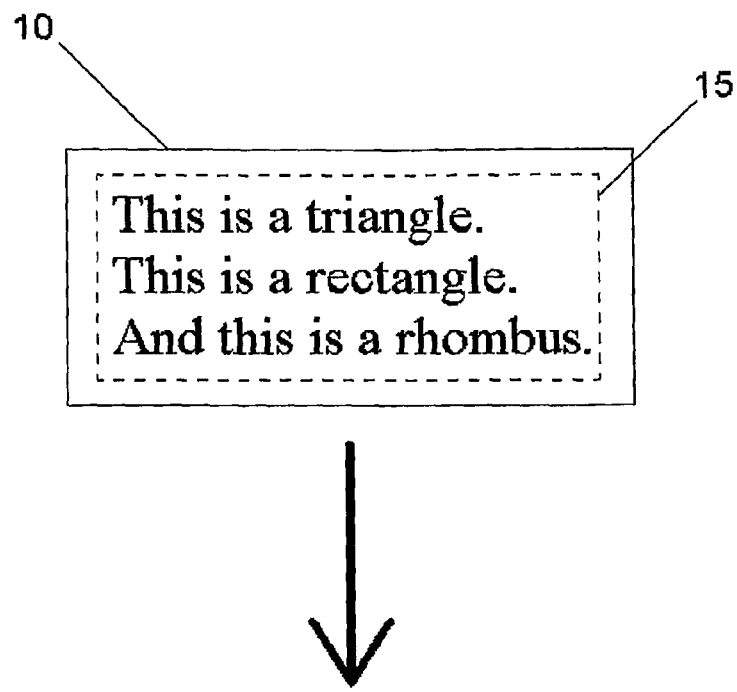
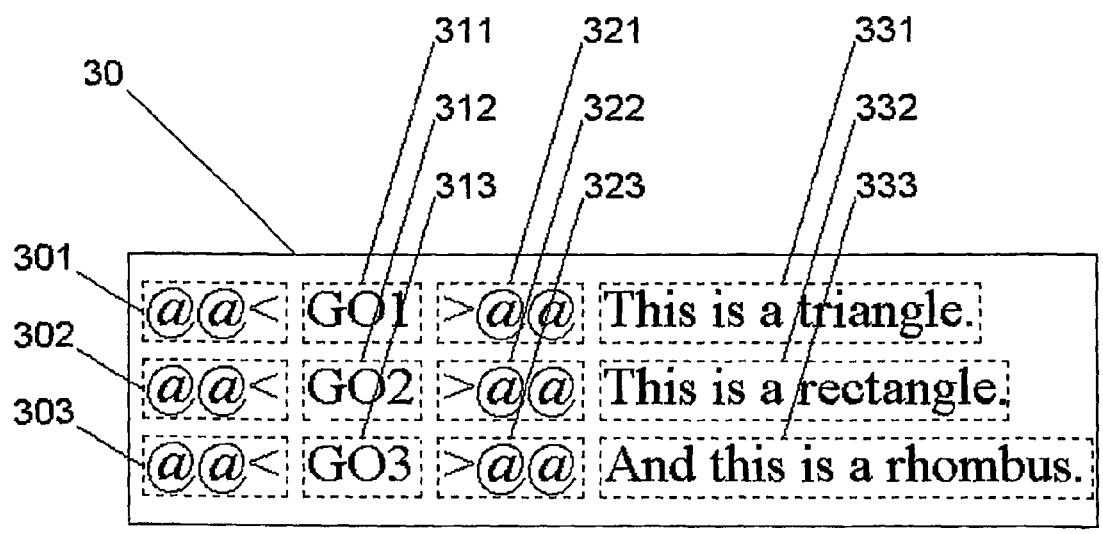

METHOD TO SYNCHRONIZE AUDIO AND GRAPHICS IN A MULTIMEDIA PRESENTATION

FIELD OF THE INVENTION

The present invention generally relates to the field of education and specifically it relates to a method for arranging a multimedia presentation having both audio and video/graphic contributions.

DESCRIPTION OF THE PRIOR ART

In the following description, the definition graphic contribution may comprise computer generated graphics, or images or a video pieces.

In traditional lessons, using a blackboard and chalk, a teacher normally speaks and draws on the blackboard at the same time. Speaking and drawing are also synchronized if a student asks the teacher to repeat it slowly, or if the teacher decides to explain quickly an easy point.

In presentations with slides or "Power Point®" presentations, the teacher speaks and decides to change a slide normally starting the speech as the new slide appears.

A lesson can be also edited as a film, and the editor synchronizes audio and video through an editing apparatus. The same lesson can be played on a computer as a film. However, once edited, a teacher cannot change the playing speed.

With the aid of a computer, a teacher can play an electronically generated sequence of images, and can associate to it portions of speech, which respectively begin as a new image appears. In the editing steps the teacher can synchronize speech and graphics, with the same problem that occurs when editing a film: the playing speed cannot be changed.

Other problems are that:

computer playable audio files, and in particular voice files, cannot be played at different speed but the natural one; any small change of the speed would unavoidably cause a distortion of the voice/music/sounds and they would seem completely unnatural to a listener; especially the voice remarkably changes at any increase or decrease of the speed, turning into a shriller or deeper voice respectively.

if fixed intervals are set for completing a speech and for displaying an image, these intervals may not fit when the displaying time of the images changes according to their size; this in particular occurs when graphics are computed by a processor, which remarkably changes the displaying speed according to the size of an image or the amount of mathematical calculations to generate the graphics.

The above drawbacks are clearer with the following example of a teacher's speech, as illustrated in FIG. 1. It is an exemplary part of a lesson. The teacher has to say: "This is a triangle. This is a rectangle. And this is a rhombus." and, at the same time, he/she has also to draw on a blackboard a triangle, then a rectangle, and last a rhombus.

More in detail:

Firstly, the teacher says the words "This is a triangle", at the same time drawing a triangle.

Secondly, the teacher says the words "This is a rectangle at the same time drawing a rectangle.

Thirdly, the teacher says the words "And this is a rhombus", at the same time drawing a rhombus.

Clearly, at the teacher's choice, the speech and the drawings are synchronized.

If in a first instance the teacher talked for 15 seconds and then the explanation is required to be repeated more slowly, this can be easily done, for example taking 30 seconds. In this second case the sequence has a longer duration, and the speech and drawings will still be synchronized.

When instructing a computer to talk and draw in a way that it looks as similar as possible to a real teacher some technical difficulties arise:

First technical difficulty—the computer has to present a voice saying the same phrases as the teacher would say. To solve this difficulty many software products are available on the market that record the actual teacher's voice and then play it. Software products also exist that create an audio file reading electronically a text.

Second technical difficulty—the computer has to draw the same drawings of the teacher in a determined time. Many graphic software programs are available as well. For the triangle, for instance, it is sufficient to store the coordinates of its three vertices. These coordinates can then be easily given to the graphic program as instructions to draw the triangle on the computer screen. To imitate the teacher's speed when drawing on the screen the available software may draw gradually a graphic contribution by appropriate timing utilities.

Third technical difficulty—the audio and the graphic presented by the computer must be synchronized, the user should have the possibility to change the speed of the graphic presentation, previously or while the computer is drawing, and the synchronization between audio and graphics must be maintained in spite of the speed changes done by the user.

Unlike the two previous technical difficulties, the last one cannot be worked out with the software available on the market.

SUMMARY OF THE INVENTION

It is therefore an object of the present invention to provide a method to synchronize audio and graphics in a multimedia presentation that works independently from the type of graphic contribution presented by the computer, keeping a synchronization between audio and all sorts of graphic contributions, like drawing shapes, drawing handwriting, drawing images, changing transparencies, drifting images, animations, and so on.

This object is accomplished by the method to synchronize audio and graphics in a multimedia presentation, wherein the multimedia presentation has speech and graphic contributions, comprising the steps of:

providing a list of graphic objects, wherein each graphic object is associated to a graphic file capable of being executed by a computer to display a corresponding graphic contribution on a screen;

creating a speech file comprising a sequence of phrases, each phrase comprising a speech contribution explaining at least one graphic contribution associated to a respective graphic object;

creating an arrangement string obtained as a sequence of a first graphic object and a respective first phrase, and then a second graphic object and a respective second phrase, and so on up to completion of all graphic objects and phrases of the list and of the speech file respectively;

Choosing a processing speed of the graphic objects;

Executing the arrangement string by an executing application, wherein the executing application:

plays a first phrase through a sound card residing in a computer, and contemporaneously processes a first graphic object at the processing speed through a graphic interface residing in the computer;

repeats the above playing and processing steps for a respective second phrase and a second graphic object, and so on for respective phrases and graphic objects up to the completion of the arrangement file, starts a next playing step and processing step only if the processing step of a corresponding graphic object has come to an end, postponing instead a next playing step and processing step if the actual processing step of a corresponding graphic object has not come to an end.

Preferably, a user can change the processing speed of the graphic objects in any moment of the execution of the arrangement file, in particular dragging a cursor appearing on the screen when executing the arrangement file.

According to a first embodiment, in the arrangement file a separating symbol is put between the graphic objects and the adjacent phrases, and wherein the executing application when meeting the separating symbol starts a next playing step and processing step only if the processing step of a corresponding graphic object has come to an end, postponing instead a next playing step and processing step if the actual processing step of a corresponding graphic object has not come to an end.

In this case, the separating symbol of the arrangement string can be ASCII standard or extended code.

Also in this case, the phrases are played through a sound card and an associated file to speech converter residing in the computer, wherein the executing application runs the file to speech converter on each respective phrase obtaining in turn an output that is played directly through the sound card.

Alternatively, the further steps are comprised of:

creating a starting times file associating one starting instant to the beginning of each phrase;

creating a voice file based on the speech file and storing the voice file in the computer, the voice file being playable through a sound card residing in the computer, and the executing application plays the voice file through the sound card for a first period comprised between a first and a second starting instant of the starting times file thus playing a respective phrase, and contemporaneously processes a first graphic object at the processing speed through the computer, repeats for a second period comprised between the second starting time and a third starting time the above playing and processing steps for a respective second phrase and a second graphic object, and so on for successive periods for respective phrases and graphic objects up to the completion of the arrangement file, stops the playing step of the voice file and starts a next playing step beginning from a next starting time only if the processing step of a corresponding graphic object has come to an end, postponing instead a next playing step if the actual processing step of a corresponding graphic object has not come to an end.

In this case, the starting times are selected from the group of a manually determined starting times, and electronically determined starting times.

Preferably each voice file is selected from the group of a recorded voice file, or an electronically synthesized voice file, and the voice file is selected from the group of a succession of voice sub-files or a single voice file obtained as a succession of voice segments.

Depending on the teacher's choice, the speech contributions in the playing steps are associated or alternated to music contributions and/or sound contributions.

BRIEF DESCRIPTION OF THE DRAWINGS

Further characteristics and the advantages of the present invention will be made clearer with the following description of an exemplary embodiment thereof, exemplifying but not limitative, with reference to the attached drawings wherein:

FIG. 4 shows an example of creation of an arrangement string as a string obtained collating the graphic objects of FIG. 3 and the phrases of FIG. 2;

DESCRIPTION OF A PREFERRED EMBODIMENT

In the following exemplary description of the method an example is used of a computer that is required to do the same operations the teacher would do as in the example given in the above introductory part. The computer may be any personal computer available on the market equipped with a sound card, a screen capable to display graphic objects, and a software means arranged to carry out the steps according to the invention, as it can be programmed easily by a person skilled in the art.

Accordingly, the computer should be instructed:

to say firstly the phrase "This is a triangle", at the same time drawing a triangle;

then to say the phrase "This is a rectangle", at the same time drawing a rectangle;

and finally to say the phrase "And this is a rhombus", at the same time drawing a rhombus.

Moreover, the audio and the graphics must be continuously synchronized even when the user changes the speed of the graphic presentation.

The example carried out with the method according to the invention can be split into the following five steps.

Figure 1:
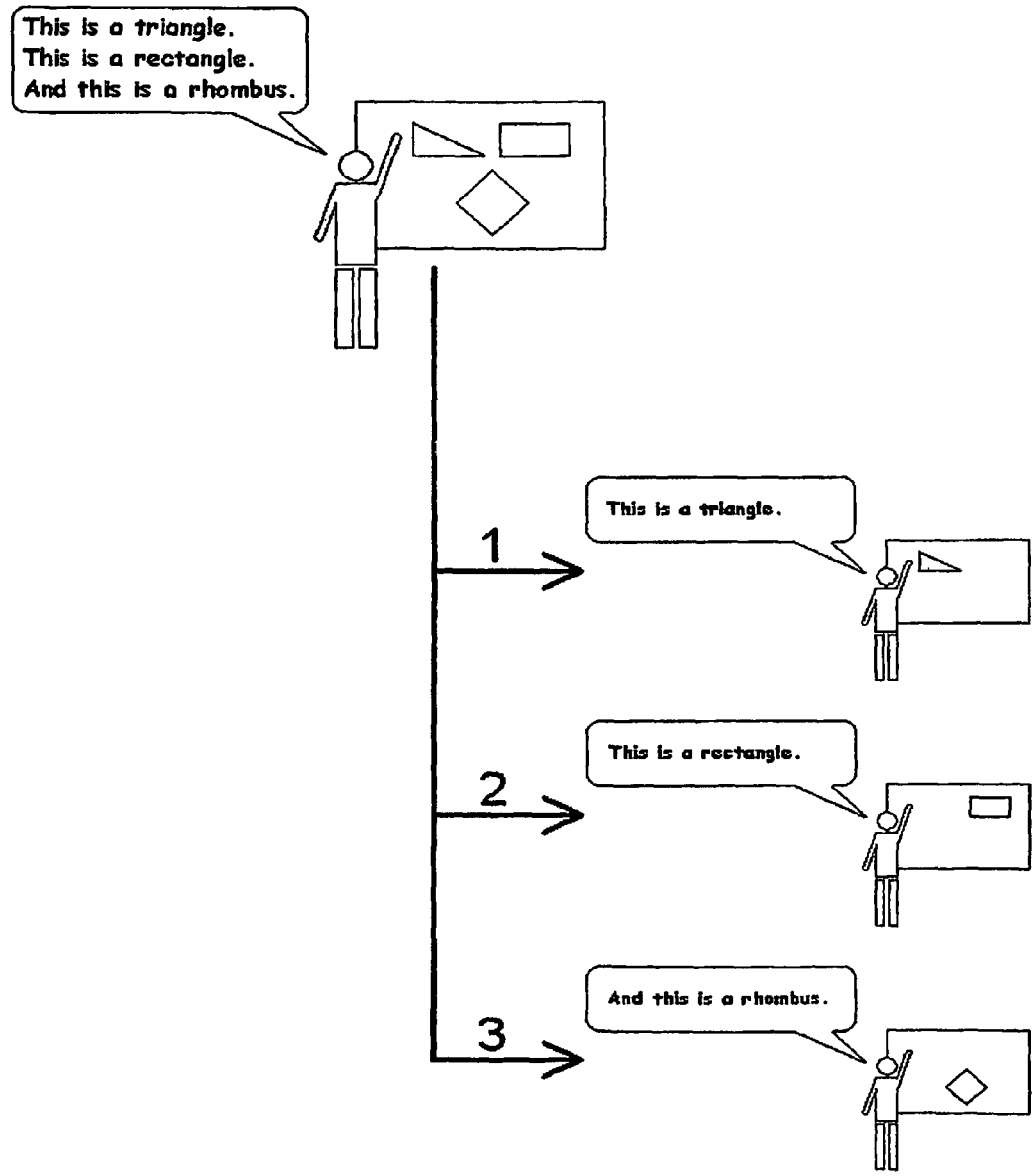
FIG. 1 shows a scheme of a teacher's speech saying in succession speech phrases and contemporaneously drawing respective graphic objects on a blackboard.
Figure 2:
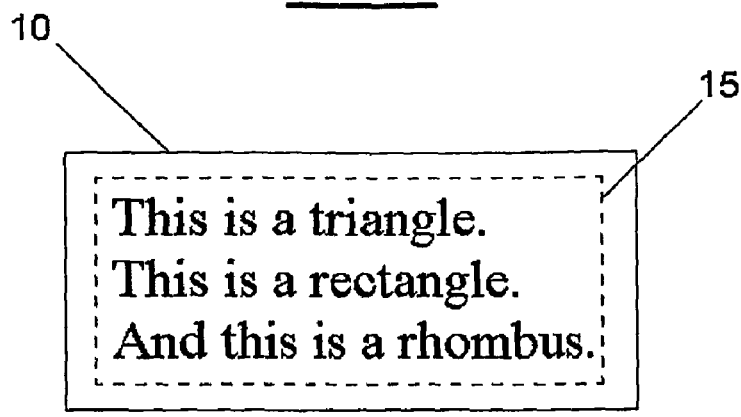
FIG. 2 shows an example of a speech file as text file, using the phrases of the exemplary teacher's speech of FIG. 1.

STEP 1. Creation of a "SpeechFile" 10, in particular a text file (FIG. 2).

In this step of the example a text file is created with the phrases 15, i.e. "This is a triangle. This is a rectangle. And this is a rhombus." This file can be created with any word processor.

Figure 3:
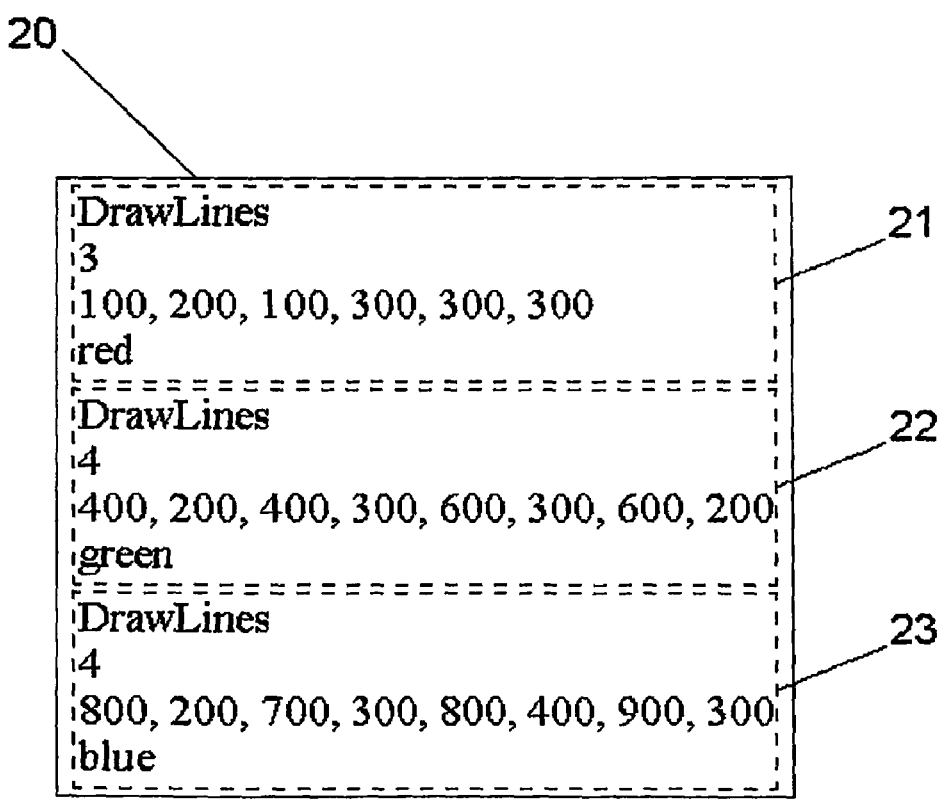
FIG. 3 shows an example of creation of a graphic objects file using the exemplary graphic objects of FIG. 2.

STEP 2. Creation of a "GraphicObjectsFile" 20 containing the description of each graphic object to be presented (FIG. 3). In this step a file is created with a list of the graphic objects to be presented, as well as their attributes i.e. type of object, location on the screen, size, colour, and so on.

In this step of the example a first graphic object (the triangle) 21, is defined as a command "DrawLines", 3 (number of lines to be drawn), x1, y1, x2, y2, x3, y3 (coordinates of the screen points to be joined by the lines), "red" (colour to be used), and so on. These attributes will be used later (step 5, step E) to draw a triangle, that is a red line from screen point (x1, y1) to screen point (x2, y2), another red line from screen point (x2, y2) to screen point (x3, y3) and another red line from screen point (x2, y2) to screen point (x1, y1). Similarly the attributes are defined of the second and third graphic objects, i.e. the rectangle 22 and the rhombus 23, respectively. (FIG. 3).

STEP 3. Creation of "ArrangementFile" 30 to specify when the graphic objects 21-23 stored in "GraphicObjectsFile" 20 have to be presented (FIG. 4) in association with the phrases 15 of "SpeechFile" 10.

To create this file the text of "SpeechFile" 10 is copied and pasted in a draft of "ArrangementFile" 30. Then, pointers are added to the graphic objects stored in "GraphicObjectsFile" 20, and inserted respectively just before the phrases they have to be synchronized with. In the example the pointers are "GO1" 311, "GO2" 312 and "GO3" 313 pointing to first, second and third graphic objects 21-23, respectively of FIG. 3.

In particular, according to "ArrangementFile" 30, the drawing step of first graphic object 21 shall be started when the enunciation starts of the words "This is a triangle" 331. So, the pointer "GO1" 311 is inserted just before these words. The same is done for the second graphic object 22 to be started when the words "This is a rectangle" 332 begin to be enunciated. So, the pointer "GO2" 312 is inserted just before these words. Finally, the same is repeated for the third graphic object 23 to be started when the words "And this is a rhombus" 333 begin to be enunciated. So, the pointer "GO3" 313 is inserted just before these words. The draft of "ArrangementFile" 30 would be the following: "GO1This is a triangle. GO2This is a rectangle. GO3And this is a rhombus.".

In order to allow "ArrangementFile" 30 to be executed automatically, the pointers "GO1" 311, "GO2" 312 and "GO3" 313 are preferably marked by a starting symbol and an ending symbol. For instance the symbols "@@<", 301, 302, 303 and ">@@", 321, 322, 323, can be used as starting and ending marks, respectively. So, "ArrangementFile" 30 would be eventually: "@@<GO1>@@This is a triangle. @@<GO2>@@This is a rectangle. @@<GO3>@@And this is a rhombus." (FIG. 4).

Of course, "ArrangementFile" 30 can be executed even if written without starting and ending marks, or any marks at all. For example, if syntax recognition instructions are given to find the letters "G, O" followed by a number, the graphic objects can be easily retrieved.

STEP 4. Creation of a "VoiceFile" 40 and a "StartingTimesFile" 50.

"VoiceFile" 40 will be sent (see hereinafter step 5D) to a sound card resident in the computer to be played as described below. "StartingTimesFile" 50 contains the starting time of each graphic object, i.e. an instant at which the graphic object has to be started to be presented.

"VoiceFile" 40 and a "StartingTimesFile" 50 can be created in a manual way (step 4A) or in an automatic way (step 4B).

Figure 5:
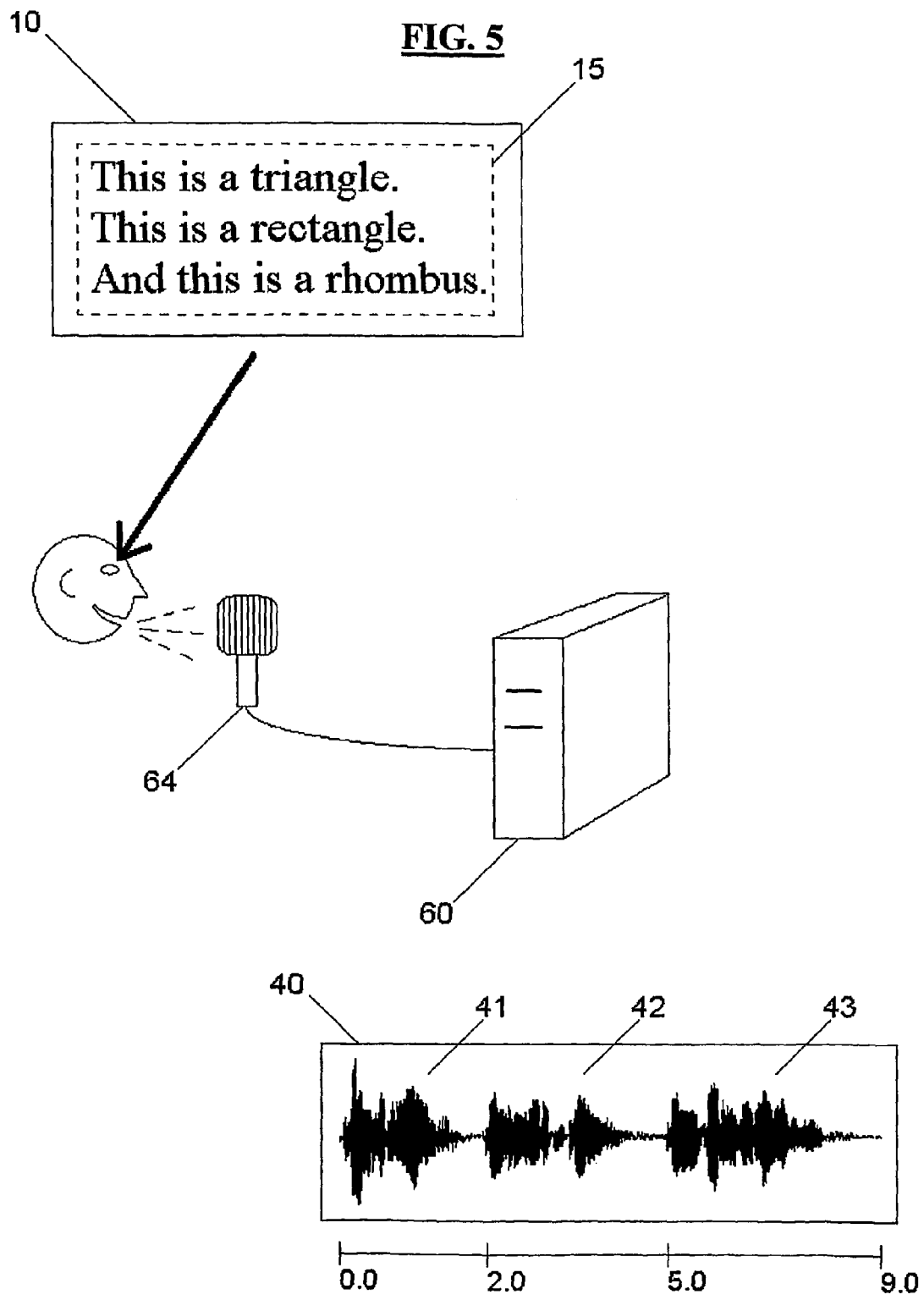
FIG. 5 shows diagrammatically a manual creation of a voice file using the phrases of the speech file of FIG. 2.

STEP 4A. Manual creation of "VoiceFile" 40 (FIG. 5): the sounds are recorded of a voice enunciating the phrases 15 of "SpeechFile" 10. This can be done by a microphone 64 receiving a voice saying the phrases 15 "This is a triangle. This is a rectangle. And this is a rhombus.". "VoiceFile" 40 is then stored for being played when necessary. For example, the playing time without pauses of phrases 15 is 9.0 seconds (FIG. 5).

Figure 6:
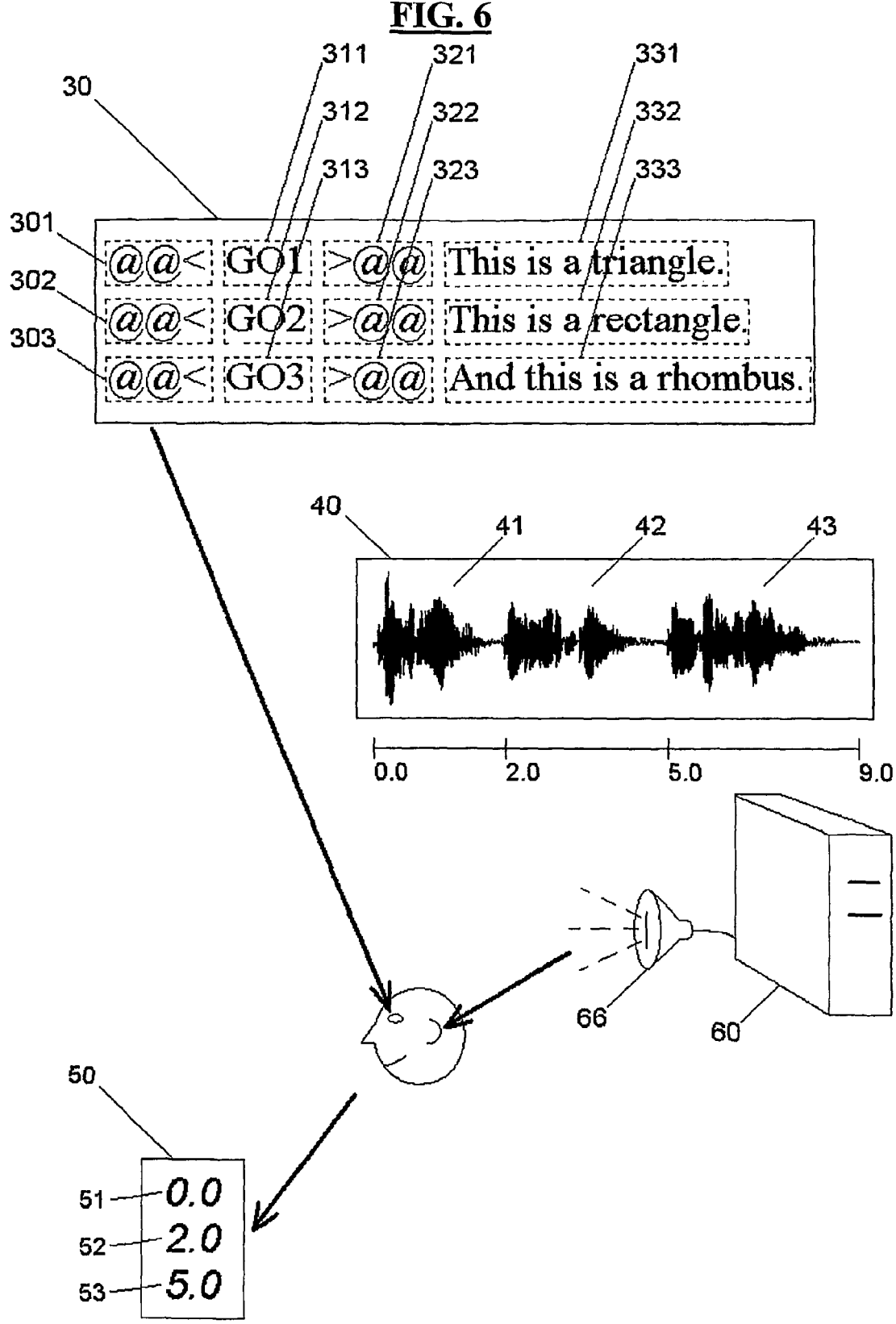
FIG. 6 shows diagrammatically a manual creation of a starting times file based on the duration of said voice files.

Manual creation of "StartingTimesFile" 50 (FIG. 6): the starting times are chosen looking at "VoiceFile" 40 as played by a normal player. After completion of the playing step of the phrase following the first pair 301, 321 of starting and ending marks, the playing step is stopped when desired, and the counted time is stored in "StartingTimesFile" 50. The same procedure is repeated for the phrases comprised between the second, 302, 322 and third 303, 323 pairs of starting and ending marks. Eventually, "StartingTimesFile" 50 contains the starting time of each graphic object to be presented, that is the numbers 0.0 51, 2.0 52 and 5.0 53 (FIG. 6).

STEP 4B. Automatic creation of "VoiceFile" 40 and "StartingTimesFile" 50 (FIG. 7).

To automatically create "VoiceFile" 40 the computer finds the text contained between each ending symbol and the next starting symbol and a text-to-speech converter 70 turns it into an audio file. Each audio file is copied at the end of "VoiceFile" 40, end the duration of each file is stored at the end of a buffer "Durations" (not shown).

Figure 7:
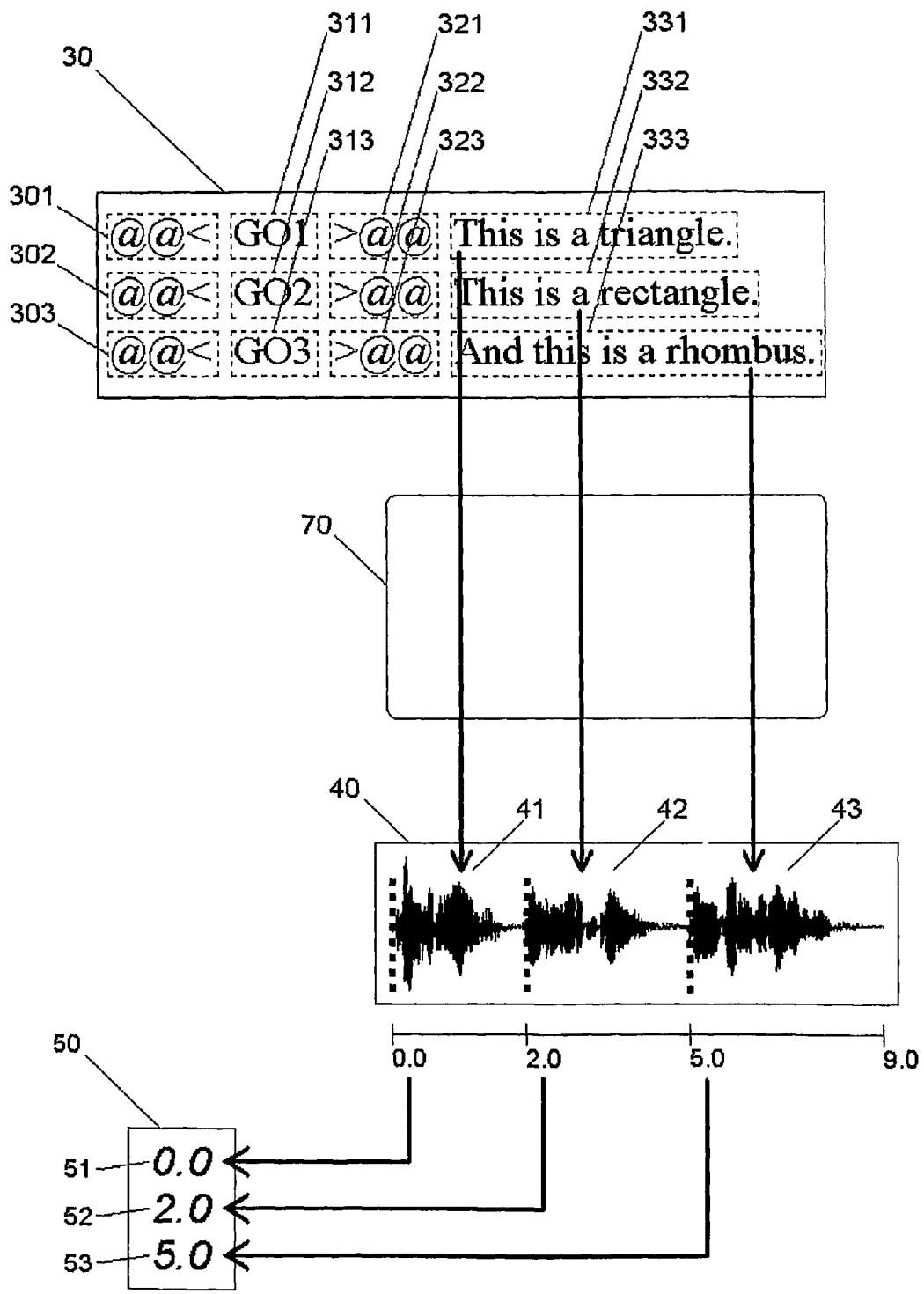
FIG. 7 shows diagrammatically an automatic creation of a starting times file.

As shown in FIG. 7, initially the computer finds first ending symbol 321 and second starting symbol 302 in "ArrangementFile" 30. The text contained between these marks is "This is a triangle" 331 and is is sent to a text-to-speech converter 70, and the output audio contribution is stored in "VoiceFile" 40. If its duration is 2.0 seconds, the number 2.0 is stored in the buffer "Durations". Then the computer finds second ending symbol 322 and third starting symbol 303 in "ArrangementFile" 30. The text contained between these marks is "This is a rectangle" 332. This text is sent to text-to-speech converter 70 to be converted in an audio contribution. Let us suppose the duration of this audio file is 3.0 seconds. This file will be copied at the end of "VoiceFile" 40. So, now the duration of "VoiceFile" 40 is 5.0 seconds and the number 5.0 is copied at the end of the buffer "Durations". Finally, the computer finds ending symbol 323 in "ArrangementFile" 30. The text contained after this symbol is "And this is a rhombus" 333. This text is sent to text-to-speech converter 70 to be converted in an audio file. The duration of this audio file is 4.0 seconds and its content is copied at the end of "VoiceFile" 40. So, now the duration of "VoiceFile" 40 is 9.0 seconds. This number, however, will not be stored in the buffer "Durations" (FIG. 7).

Now the computer creates "StartingTimesFile" 50 copying the buffer "Durations" adding the number 0.0 in top of it. "StartingTimesFile" 50 contains the starting time 51-53 of each graphic object, i.e. 0.0, 2.0 and 5.0 (FIG. 7).

It will be appreciated that STEP 4 could also be omitted. In fact, a person skilled in the art would see that "VoiceFile" 40 and "StartingTimesFile" 50 can also be not necessary if a text to speech converter is used that creates and plays in real time speech contributions corresponding to "SpeechFile" 10. This can be done at the choice of the skilled person who decides how to arrange the flow of the stored data.

STEP 5. Playing the audio file and presenting graphics synchronously (FIGS. 8, 9, 10 and 11).

Figure 8:
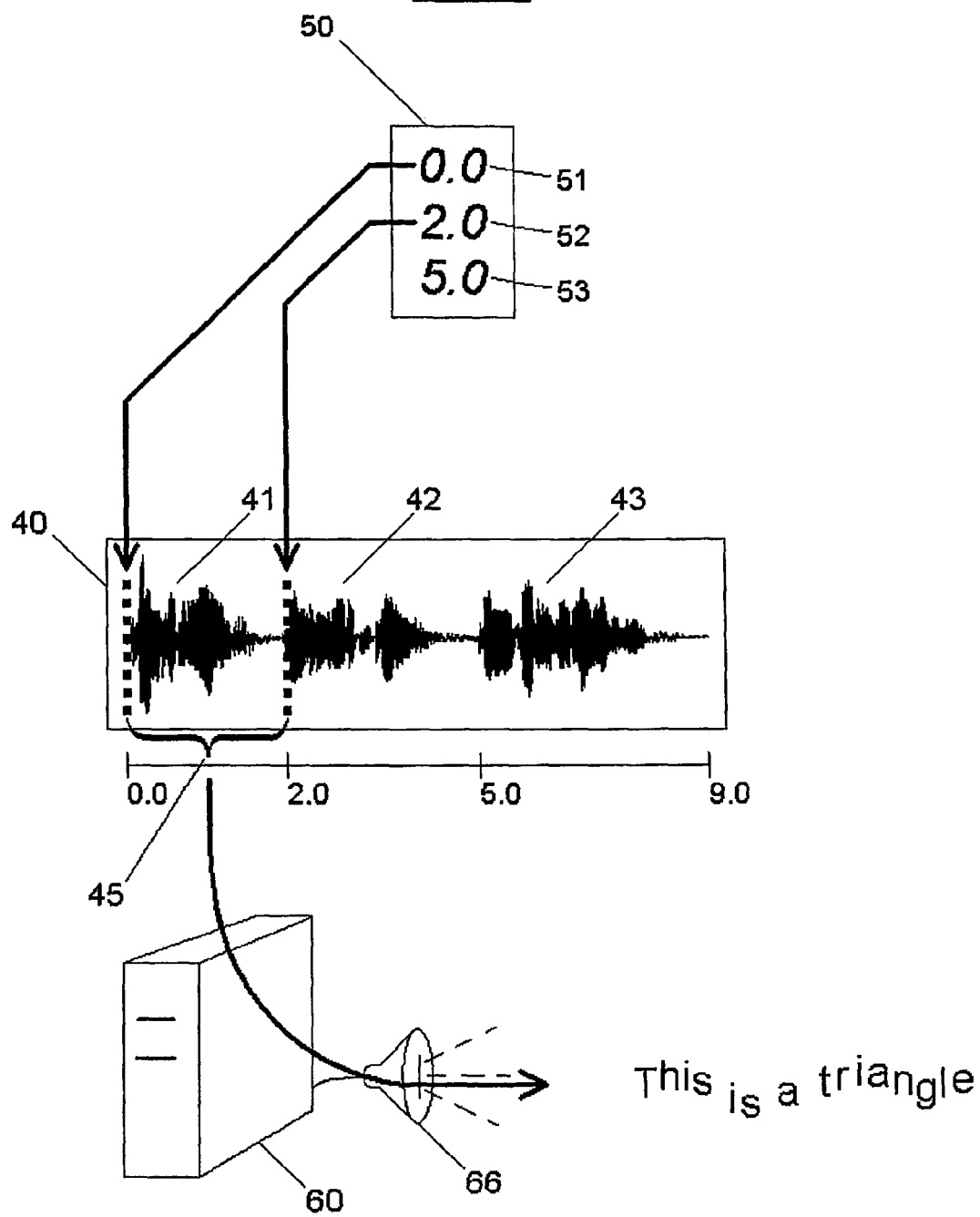
FIG. 8 shows diagrammatically a step of running the voice file of FIG. 5.
Figure 9:
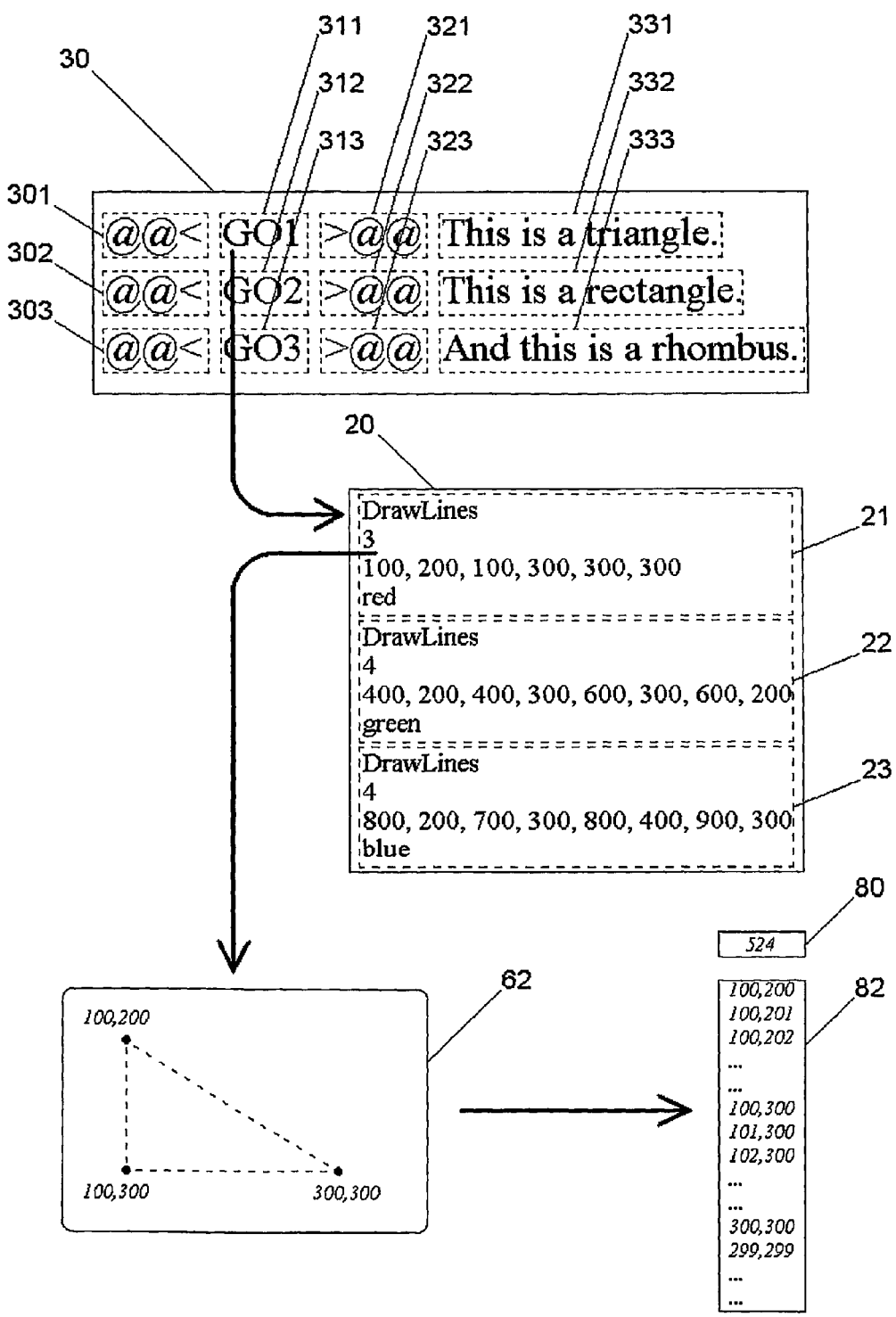
FIGS. 9, 10 and 11 show diagrammatically a step of playing the arrangement string of FIG. 4 and processing the graphic objects of FIG. 3.

The synchronization is obtained by playing the audio file not as a single audio contribution or piece from beginning to end, but as a sequence of many pieces. The computer, in other words, starts presenting the first piece 41 of the audio file and the corresponding graphic object 21 (FIGS. 8 and 9). Then the computer waits until both these presentations have been completed. At this point the computer presents the second piece 42 of the audio file and the corresponding graphic objects 22. Then it waits again until both these presentations have been completed. And so on up to the end. Let us see all this in details with our example.

First, the computer has to present the first piece 41 of audio file 40 and the corresponding graphic objects 21, that is the computer has to say the phrases "This is a triangle", at the same time drawing the triangle. This will be done in six steps, from step A to step F.

Step A. The computer finds the first piece 41 of audio file to be played (FIG. 8).

To do this the computer reads the first and second numbers, 51 and 52, stored in "StartingTimesFile" 50. They are 0.0 and 2.0, respectively. The first piece 41 of audio file to be played is then from 0.0 to 2.0. When this piece will be sent later (see hereinafter step D) to the sound card to be played the words "This is a triangle" are enunciated (FIG. 8).

Step B. The computer finds the corresponding graphic objects to be presented (FIG. 9).

The computer finds in "ArrangementFile" 30 the first starting and ending marks 301, 321. The pointer between them, in this case one symbol 311, is GO1, and so first graphic object 21 stored in "GraphicObjectsFile" 20 is the first to be presented (FIG. 9).

Step C. The computer calculates what exactly has to be drawn and stores it in some buffers (FIG. 9).

The computer reads, from "GraphicObjectsFile" 20, the attributes of graphic object "DrawLines" 21 pointed by pointer 311, GO1. So, the computer calculates the coordinates of all pixels forming the lines to be drawn and stores them in a PixelsCoordinates buffer 82. The total number of pixels will be stored in the buffer TotalNumberOfPixelToBeDrawn 80. Let us suppose this number is 524 (FIG. 9).

Step D. The computer starts the presentation of the first piece 41 of audio file (FIG. 8).

To do this the computer sends to the sound card the order to start playing "VoiceFile" 40 from position 51 to position 52, i.e. starting times 0.0 and 2.0 found at step A. The sound card starts enunciating the phrase "This is a triangle", thus freeing the computer, which can go to the next step without awaiting the completion of the playing step.

Step E. The computer presents first graphic object 21 as represented by the three lines 62 of FIG. 9.

Below a description is given to show how certain parameters, and in particular the processing speed, can be changed during the presentation of a graphic object (FIGS. 10 and 11) and how this change can affect the duration of the presentation.

The step E will now be detailed for the case of drawing a triangle. Of course, the same applies when drawing other types of graphic contributions, such as simulating handwriting, simulating filling with colours, and so on.

Figure 10:
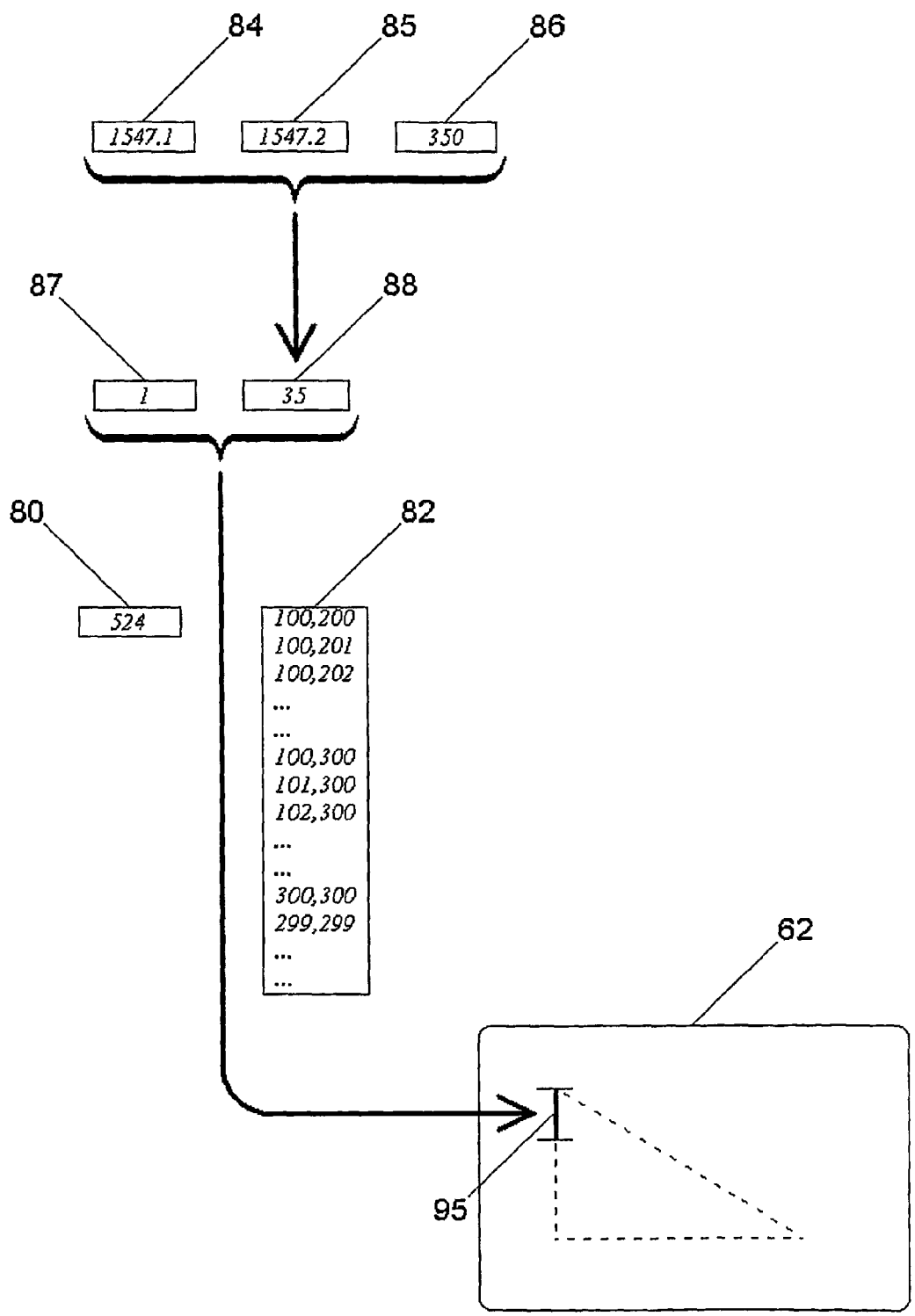
Figure 11:
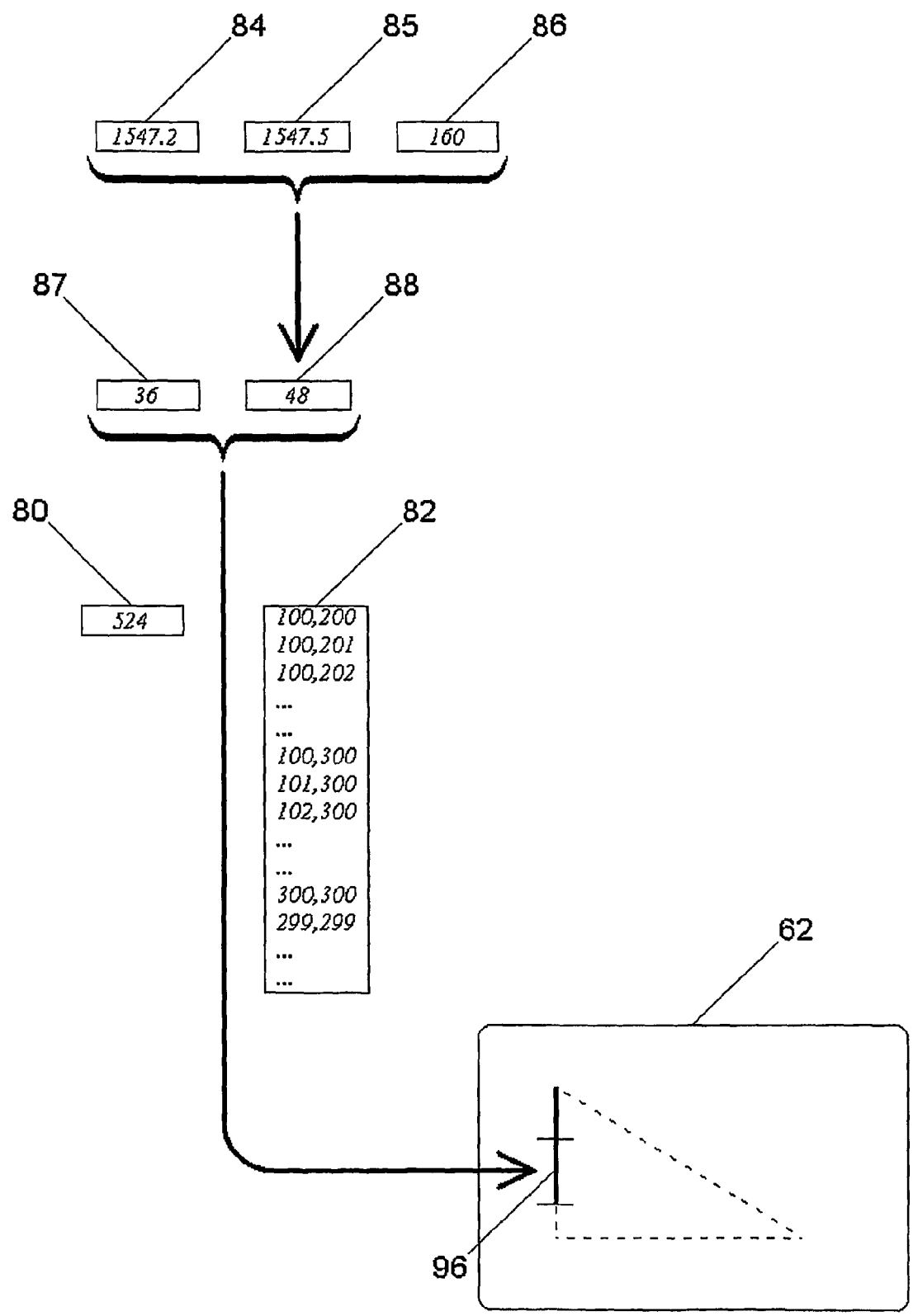

The presentation of all the 524 pixels, contained in the buffer PixelsCoordinates 82, is done gradually, as shown in FIGS. 10 and 11, where the processing and the drawing of a first and a second portion of the triangle are shown, respectively.

Figure 12:
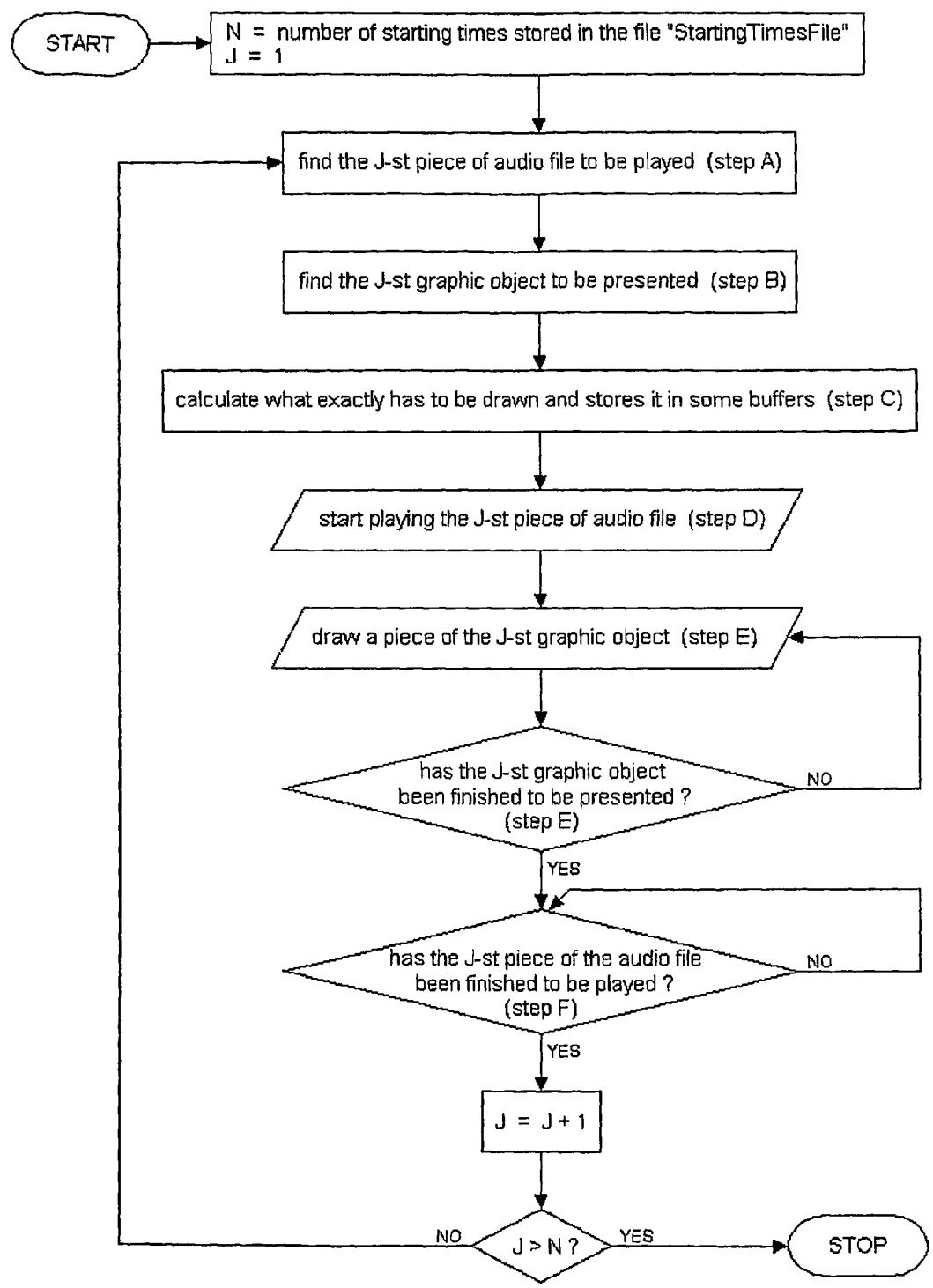
FIG. 12 is a flow chart of the execution steps of the arrangement file.
Figure 13:
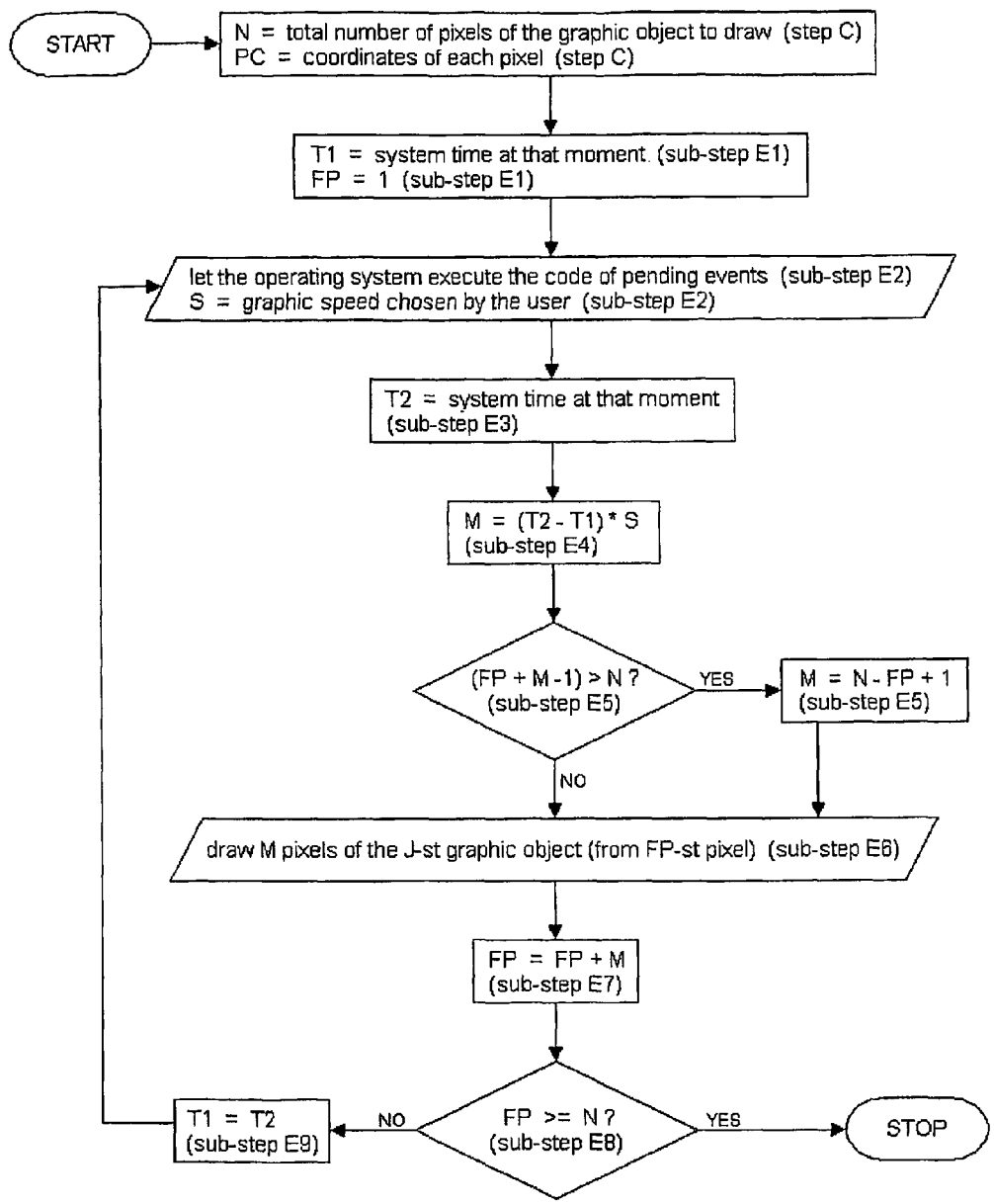
FIG. 13 is a flow chart of the steps of processing a graphic object at a determined processing speed chosen by a user.

STEP 5 is also summarized in the flow charts shown in FIGS. 12 and 13. FIG. 12 shows the synchronization between audio and graphics presentations, and FIG. 13 shows the drawing graduality.

Sub-step E1. The computer reads the system time and stores it in a buffer 84, called Time1. In the example the system time is 1547.1 seconds. Moreover, the value 1 is stored in the buffer FirstPixelToDraw 87.

Sub-step E2. Then, the control of the process is given to the operating system that executes any pending events routines. A pending event can be, for instance, choosing a graphic speed by the user, for example pressing a mouse button, pressing a key, dragging the mouse, dragging a cursor on the screen, and so on. Other parameters can also be changed by the user during the execution of the presentation.

Sub-step E3. The computer reads the system time and stores it in a buffer Time2 85, for example 1547.2 seconds.

Sub-step E4. The computer calculates the number of pixels forming the first portion 95 of the drawing. This number depends upon the time elapsed and upon the speed of the graphic presentation chosen by the user. So, the computer measures the elapsed time by calculating the difference between the buffers Time2 85 and Time1 84, which is 0.1 seconds. Then the computer reads the speed of graphic presentation 86 chosen by the user. For example it is 350 pixels per second. By multiplying 0.1 by 350 we get 35. This means the first portion of drawing 95 is composed of 35 pixels. This value is stored in the buffer TotalPixelsToDraw 88.

Sub-step E5. The computer checks if the value (FirstPixelToDraw 87+TotalPixelsToDraw 88−1) exceeds the value of the buffer TotalNumberOfPixelToBeDrawn 80. If yes, then the value (TotalNumberOfPixelToBeDrawn 80−FirstPixelToDraw 87+1) will be stored in the buffer TotalPixelsToDraw 88. This check has to be done to prevent from reading beyond the end of the PixelsCoordinates 82 buffer.

Sub-step E6. The computer draws (FIG. 10) on the screen 35 pixels (this is the value stored in the buffer TotalPixelsToDraw 88) as stored in the buffer PixelsCoordinates 82, starting from the 1st (this is the value stored in the buffer FirstPixelToDraw 87).

Sub-step E7. The computer adds the value of the buffer TotalPixelsToDraw 88 (that is 35) to the buffer FirstPixelToDraw 87. The value in this buffer is now 36.

Sub-step E8. The computer checks if first graphic object 21 has been drawn entirely. This is done by comparing the value of FirstPixelToDraw 87 buffer (that is 36) to that of the TotalNumberOfPixelToBeDrawn 80 buffer (that is 524). 36 is less than 524. Thus the drawing has not been completed, and the computer will continue drawing.

Sub-step E9. The computer stores the value of buffer Time2 85 in the buffer Time1 84. So Time1 84 now contains the number 1547.2.

Sub-step E10. The same as sub-step E2.

Sub-step E11. The computer reads the system time and stores it in the buffer Time2 85. For example the value stored is 1547.5 seconds.

Sub-step E12. The computer calculates the number of pixels forming the second portion 96 of the triangle. The elapsed time is 0.3 seconds (given by the difference between the values of buffers Time2 85 and Time1 84). Now, for example, the speed of the graphic presentation 86 is 160 pixels per seconds, as changed in the meantime by the user. So, multiplying 0.3 by 160 we get 48. This means that the second portion 96 of the triangle has 48 pixels. This value is stored in the buffer TotalPixelsToDraw 88.

Sub-step E13. The same as sub-step E5.

Sub-step E14. The computer draws (FIG. 11) on the screen 48 (this is the value stored in the buffer TotalPixelsToDraw 88) of the pixels stored in the buffer PixelsCoordinates 82, starting from the 36th pixel, i.e. value stored in the FirstPixelToDraw 87 buffer.

Sub-step E15. The computer adds the value of the TotalPixelsToDraw 88 buffer (that is 48) to the buffer FirstPixelToDraw 87. The value in this buffer is now 84.

Sub-step E16. The computer checks if first graphic object 21 has been drawn entirely, by comparing the value of FirstPixelToDraw 87 buffer (that is 84) to that of the buffer TotalNumberOfPixelToBeDrawn 80 (that is 524). 84 is less than 524. Thus the drawing has not been completed, and the computer will continue drawing.

The drawing of first graphic object 21 will be completed when the value of FirstPixelToDraw 87 buffer is the same as that TotalNumberOfPixelToBeDrawn 80 buffer. At this point the computer goes to step F.

Step F. The computer checks if the presentation of the first piece 41 of audio file has been played completely. If not, the computer postpones starting the next step.

In fact, at the end of step E the computer should have enunciated "This is a triangle" and drawn the triangle. Even if the two operations started almost simultaneously; almost always they would end at different times. In addition, the user chooses the speed of the graphic presentation and can change this speed at any moment, even during step E. According to the invention the computer will not start the presentation of the next piece of audio file and the next drawing before the previous ones have been completed.

Step G. Now the computer has to present the second piece 42 of audio file and the corresponding graphic objects 22, that is the computer has to say the phrases "This is a rectangle", at the same time drawing a rectangle. This will be done in six steps as well similar to the A-F steps, and the same is repeated for the third piece 43 of audio file and the corresponding graphic objects 23, that is the computer has to say the phrases "This is a rhombus", at the same time drawing a rhombus.

At this point both the audio and the graphic presentations have been completed.

In an alternative embodiment of the method, the presentation of the audio contributions can be done in a different way. In particular, whereas as above described a single audio file was created, called "VoiceFile" 40, which could be played and stopped where desired, instead, many audio files can be created, each corresponding to a phrase, and either stored to be played in due course, or created and played each in real time.

In this embodiment, STEPS 1-3 are the same. In STEP 4, instead, a plurality of audio files is created, "VoiceFile1", "VoiceFile2", and so on, to be played completely by the sound card.

If these files are created manually (STEP 4A), in "ArrangementFile" 30 marks 321 and 302 of FIG. 7 are found, and the phrase between them is "This is a triangle" 331. The user enunciates it by a microphone 64 and the computer stores a "VoiceFile1". This operation can be assisted by the computer with a user-friendly interface, and the user simply follows the instructions of this interface. The same is repeated for the other phrases, creating respectively a "VoiceFile2" and a "VoiceFile3".

Instead, if these files are created automatically (STEP 4B), as the computer finds first ending symbol 321 and second starting symbol 302 in "ArrangementFile" 30 of FIG. 7, the text contained between them, i.e. "This is a triangle" 331, is sent to a text-to-speech converter and turned into "VoiceFile1". Depending upon how the executing program is arranged, this audio file can be either stored, to be played in a desired time, or it can be played in real time. The same is repeated for the other phrases, creating respectively a "VoiceFile2" and a "VoiceFile3".

In both cases, a "StartingTimesFile" is not needed in step 5.

In particular, in case, the audio contributions are created and played in real time, the computer finds the first piece of text 331, retrieving first ending symbol 321 and second starting symbol 302 in "ArrangementFile" 30. The text contained between these marks is "This is a triangle" 331, which is sent to the text-to-speech converter and turned into an audio file, for example called "PresentPieceOfVoiceFile". Immediately, it starts the presentation of "PresentPieceOfVoiceFile", sending it to the sound card that plays it completely. Since the sound card carries out the playing step autonomously, the computer can start presenting the triangle 21.

At the same time, the computer can prepare the second piece of text to be converted into speech, creating an audio file "NextPieceOfVoiceFile". In particular, both the actual graphic presentation and creation of the next audio file can be done gradually at the same speed.

For example, after the above sub-step E6, when the first portion 95 of triangle is drawn, a portion of "NextPieceOfVoiceFile" can be created. Similarly, at the end of sub-step E14, when the second portion 96 of triangle is drawn, another portion of "NextPieceOfVoiceFile" can be created. And so on.

Then, in Step F, if the computer finds that the presentation of the first piece 41 of audio file is complete, then it deletes "PresentPieceOfVoiceFile" and renames "NextPieceOfVoiceFile" as "PresentPieceOfVoiceFile" and then it goes to the next step.

According to the invention, to capture the interest of a student in a lesson presented by a computer, it is important that the speed of the lesson is customized by the student same. A standard speed cannot be suitable for all students, and when playing the lesson for a first time a same student may require a slower speed than when repeating the presentation.

According to the invention, the change of speed does not affect the quality and naturalness of the presentation, and both the speech and drawing contributions are presented in such a way that they look like as presented by a real teacher, keeping synchronization in spite of any change of the speed done by the student.

Figure 14:
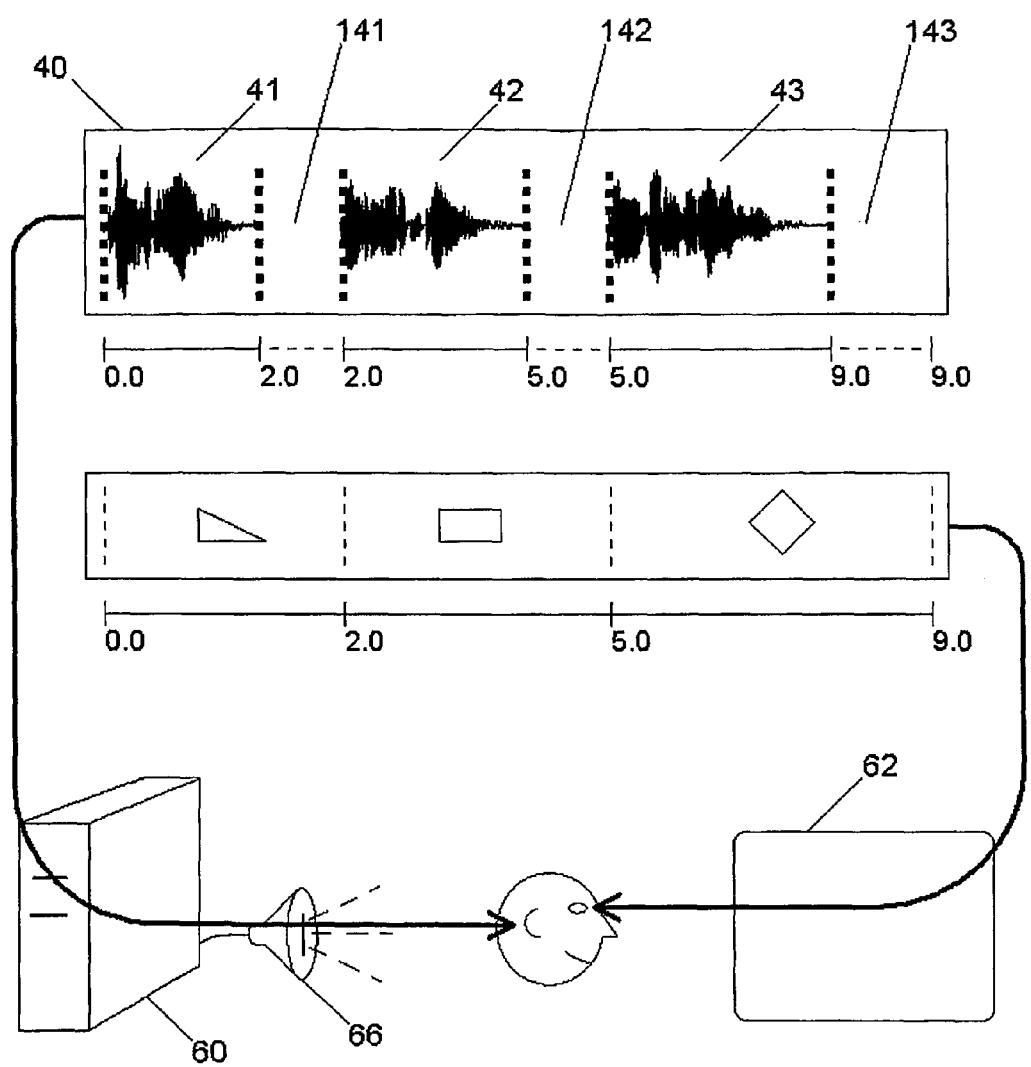
FIG. 14 is a block diagram of the execution of the arrangement string in case the processing of the graphic objects has not come to an end when the playing steps of each phrase of the speech file are paused.
Figure 15:
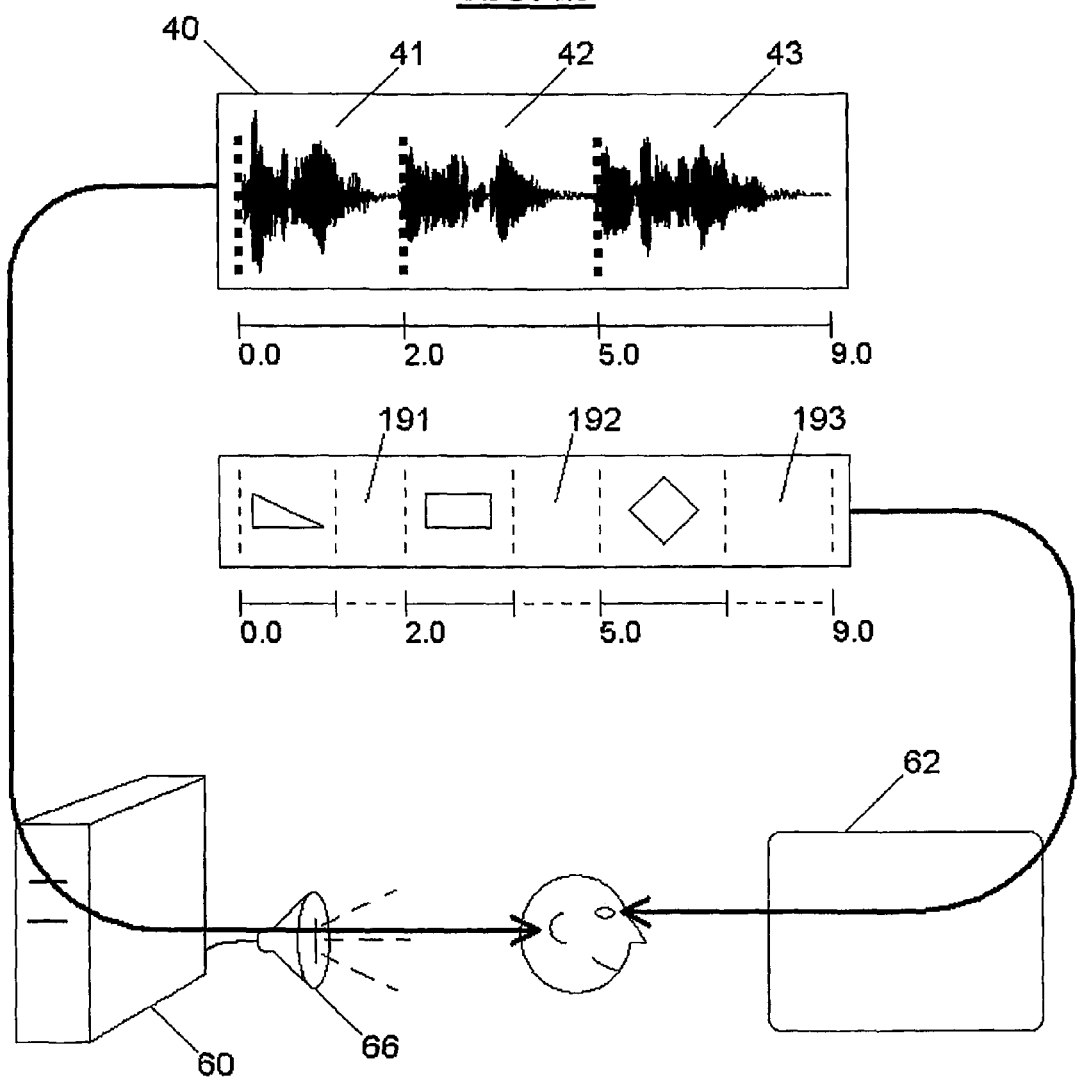
FIG. 15 is a block diagram of the execution of the arrangement string in case the processing of the graphic objects has come to an end when the playing steps of each phrase of the voice file are paused, resulting as if the voice file is not paused at all.

In particular, the computer enunciates all the phrases from the beginning to the end, and always synchronized with the respective graphic contributions, as shown in FIGS. 14 and 15, where it is supposed that the student has chosen a very slow or a very fast speed of the graphic presentation, respectively. In these figures it is also supposed that the speed is kept constant during the presentation.

When the speed of the graphic presentation is very slow (FIG. 14), to keep the synchronization pauses 141 142 143 are added after a respective piece of audio file. Instead, when the speed of the graphic presentation is very fast (FIG. 15), the drawing of the graphic objects is completed in advance, see 191 192 193, before the corresponding pieces of audio file, and no pauses are added. Since the method is piloted through the audio playing steps, the method allows the computer to talk and draw almost exactly as a teacher does.

If a graphic contribution has to be presented in a very detailed way, the teacher can split into very small parts. For example, when explaining a triangle, the teacher can describe each side, for example in a square triangle he can describe each cathetus and the hypotenuse separately.

The teacher can choose and edit the arrangement file as he finds better for the comprehension of the lesson. For example, the phrase "This is a house. It has a door, four windows, a tree, and a dog." is preferably split into five phrases, as well as the corresponding graphic contributions, unless it is displayed as a unique drawing, to explain a very simple concept from where to start more complex descriptions.

The foregoing description in the form of examples will so fully reveal the invention according to the conceptual point of view, so that others, by applying current knowledge, will be able to modify and/or adapt for various applications such examples without further research and without parting from the invention, and it is therefore to be understood that such adaptations and modifications will have to be considered as equivalents to the specific examples. The means and the materials to realise the different functions described herein could have a different nature without, for this reason, departing from the field of the invention. It is to be understood that the phraseology or terminology employed herein is for the purpose of description and not of limitation.

The invention claimed is:

1. A method to synchronize audio and graphics in a multimedia presentation, wherein said multimedia presentation has speech and graphic contributions, said speech and graphics contributions being produced independently from each other, said method comprising the steps of:
   providing a plurality of graphic objects, wherein:
   each graphic object is a shape or a handwriting, each said shape or handwriting made of at least one line;
     each graphic object is associated to a graphic file capable of being executed by a computer to gradually display a corresponding graphic contribution on a screen;
     each graphic object is executed by drawing gradually each line of said shape or said handwriting on said screen such that each line appears as if gradually drawn by a real teacher in real time; and
     said graphic file comprises coordinates that are provided to said computer as instructions to calculate coordinates of pixels of each said at least one line and to draw gradually said at least one line said shape or said handwriting on said screen;
   providing a list of said graphic objects;
   creating a speech file comprising a sequence of phrases, each of said phrases comprising a speech contribution explaining at least one graphic contribution associated to a respective graphic object, each said graphic contribution in the form of a shape or handwriting explained by a corresponding phrase of said speech file;
   creating an arrangement file obtained as a sequence of a first graphic object and a respective first phrase, and then a second graphic object and a respective second phrase, and so on, up to completion of all graphic objects and phrases of said list and of said speech file respectively;
   choosing a drawing speed of the graphic objects, said drawing speed being a speed with which each said line of said shape or said handwriting is drawn gradually on said screen; and
   executing said arrangement file by an executing application, wherein said executing application:
     starting from a first instant, plays a first phrase referred to a first graphic object through a sound card residing in a computer, and
     starting from said first instant, processes said first graphic object by gradually drawing on said screen each said line of a first graphic contribution in the form of a first shape or handwriting at said drawing speed through a graphic interface residing in said computer;
     starting from a second instant, repeats the above playing and processing steps for a respective second phrase referred to a second graphic object, and processes said second graphic object by gradually drawing on said screen each said line of a second graphic contribution in the form of a second shape or handwriting, and so on starting from respective instants for respective phrases and graphic objects up to the completion of the arrangement file, and
     starts a next playing step and a next processing and drawing step from a same next instant only if the previous playing and drawing steps of a corresponding previous graphic object have come to an end, postponing instead a next playing if the previous playing and drawing steps of a corresponding graphic object have not come to an end, and postponing a next drawing step if the previous playing and drawing steps have not come to an end.

2. Method according to claim 1, wherein said drawing speed of the graphic objects can be changed by a user in any moment of the execution of said arrangement file, even while gradually drawing a single graphic object, the speed being changed by dragging a cursor appearing on the screen when executing the arrangement file.

3. Method according to claim 1, wherein in said arrangement file a separating symbol is put between the graphic objects and the adjacent phrases, and wherein said executing application when meeting said separating symbol starts a next playing step and gradual drawing step only if the gradual drawing step of a corresponding graphic object has come to an end, postponing instead a next playing step and gradual drawing step if the actual gradual drawing step of a corresponding graphic object has not come to an end.

4. Method according to claim 3, wherein said separating symbol of said arrangement file is an ASCII standard or extended code.

5. Method according to claim 1, wherein said phrases are played through a sound card and an associated file-to-speech converter residing in said computer, wherein said executing application runs said file-to-speech converter on each respective phrase obtaining in turn an output that is played directly through said sound card.

6. Method according to claim 1, comprising the further steps of:
   creating a starting times file associating one starting instant to the beginning of each phrase;
   creating a voice file based on said speech file and storing said voice file in said computer, said voice file being playable through a sound card residing in said computer, and said executing application
   plays said voice file through said sound card for a first period comprised between a first and a second starting instant of said starting times file thus playing a respective phrase, and contemporaneously
   processes a first graphic object at said drawing speed through said computer,
   repeats for a second period comprised between the second starting time and a third starting time the above playing and processing steps for a respective second phrase and a second graphic object, and so on for successive periods for respective phrases and graphic objects up to the completion of the arrangement file,
   starts a next playing step and next processing and drawing step from a same next instant only if the previous playing and drawing steps of a corresponding previous graphic object have come to an end, postponing instead a next playing step if the previous playing and drawing steps have not come to an end, and postponing a next drawing step if the previous playing and drawing steps have not come to an end.

7. Method according to claim 6, wherein the starting times are selected from the group of a manually determined starting times, and electronically determined starting times.

8. Method according to claim 6, wherein said voice files are selected from the group of recorded voice files, or electronically synthesized voice files.

9. Method according to claim 6, wherein said voice file is selected from the group of a succession of voice sub-files or a single voice file obtained as a succession of voice segments.

10. Method according to claim 1, wherein said speech contributions in said playing steps are associated or alternated to music contributions and/or sound contributions.

11. Method according to claim 6, wherein said speech contributions in said playing steps are associated or alternated to music contributions and/or sound contributions.

* * * * *